(12) United States Patent
Maierhofer et al.

(10) Patent No.: US 6,676,057 B2
(45) Date of Patent: Jan. 13, 2004

(54) DRIVE FOR A BELT TENSIONER

(75) Inventors: Gunter Maierhofer, Ulm (DE); Gerhard Klingauf, Balzheim (DE); Dieter Beck, Gerstetten (DE); Katharina Löw, Stuttgart (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 0 days.

(21) Appl. No.: 10/128,458

(22) Filed: Apr. 24, 2002

(65) Prior Publication Data

US 2002/0153444 A1 Oct. 24, 2002

(30) Foreign Application Priority Data

Apr. 24, 2001 (DE) .......................... 101 20 019

(51) Int. Cl.[7] ............................................... B60R 22/46
(52) U.S. Cl. ....................................................... 242/374
(58) Field of Search ........................ 242/374; 280/806; 297/478, 480; 60/632–638

(56) References Cited

U.S. PATENT DOCUMENTS

| 5,667,161 A | 9/1997 | Mitzkus et al. ............. 242/374 |
| 5,899,399 A | 5/1999 | Brown et al. ................ 242/374 |
| 5,906,328 A | 5/1999 | Hamaue et al. |

FOREIGN PATENT DOCUMENTS

| DE | 198 26 305 A1 | 12/1998 |
| DE | 199 61 109 A1 | 6/2001 |
| JP | 11129867 A | 5/1999 |

Primary Examiner—John M. Jillions
(74) Attorney, Agent, or Firm—Foley & Lardner

(57) ABSTRACT

A drive for a belt tensioner for safety belts has a drive chamber formed between two plates. A drive band whose two ends are fastened to a drive shaft such that the drive band forms a loop which can be exposed to expanding gas discharged from a gas outlet such that the drive band winds off and drives the drive shaft. The drive band is fixed to the plates by a fixing apparatus at a position disposed between its ends.

11 Claims, 2 Drawing Sheets

DRIVE FOR A BELT TENSIONER

BACKGROUND OF THE INVENTION

The invention relates to a drive for safety a belt tensioner having a drive chamber.

German Offenlegungsshcrift DE 199 61 109 A discloses a belt tensioning safety belt system which is particularly adapted for use in motor vehicles.

This arrangement includes two side plates and a drive band which is disposed between the side plates. The ends of the drive band are fastened to a drive shaft. The drive band is wrapped around the drive shaft to form a loop. The interior of this loop can be exposed to expanding gases discharged from a gas outlet in a manner which expands the loop and draws the drive band off the drive shaft in a manner which induces the drive shaft to rotate.

With this arrangement, in the event of an accident, the safety belt is tensioned through a few centimeters of the safety belt being wound up on a belt reel. The belt reel sits on the drive shaft and is driven by the gas powered drive arrangement. However, for an appreciable amount of belt tensioning to take place, the belt reel, and thus also the drive shaft, must be rotated by a significant amount.

This amount of rotation is only possible if a substantial length of the drive band can wind off the drive shaft and produce a sufficient amount of torque. This requires that the drive band have a substantial length and also requires a sufficiently large space for the drive band loop to expand into. Accordingly, expansion chambers of this type of drive must be of a relatively large. This induces the drawbacks that the device requires a relatively large amount of space when disposed in a motor vehicle or the like, and is accompanied by a relatively large weight penalty.

SUMMARY OF THE INVENTION

An underlying object of the invention is to provide a compact drive for a belt tensioner.

According to an embodiment of the invention, a drive of the invention is provided wherein the drive band is fixed to the plates at a position disposed between its ends by a fixing apparatus. The movement of the drive band in the case of its winding off is very limited due to this design. The loop formed by the drive band can therefore no longer expand uniformly in all directions on being exposed to the expanding gas, but is prevented from expanding in at least one direction by the fixing apparatus. The dimensions of the drive chamber can be small, and the space consumed by the drive thus reduced, in the direction in which the expansion of the loop is prevented. In this way, not only the space requirements of the drive, but also the drive weight can be reduced.

Advantageous embodiments of the invention are described in the dependent claims, the description and the drawings.

The fixing apparatus can, for instance, have two fixed elements in a first advantageous embodiment, with the drive band being wound around them. The winding angle around each of the two fixed elements is preferably more than 180°.

When the drive is actuated, the expanding gas discharged from the gas outlet opening exerts a force onto the drive band. The forces acting onto the drive band are deflected at the fixed elements of the fixing apparatus such that they act in opposite directions and compensate one another. A slipping of the drive band through the fixing apparatus is thus prevented in a simple manner.

It has moreover proved to be particularly advantageous if more than one winding around at least one of the two fixed elements is provided.

In this case, forces acting onto the drive band by the expanding gas result in the windings contracting. The drive band is thus not only prevented from slipping through the fixing apparatus by a mutual compensation of the forces, but is additionally fixed in the fixing apparatus by an increase in the friction of the drive band in the windings.

In an alternative advantageous embodiment, the fixing apparatus is formed by two fixed elements and a moving element, with the fixed elements preferably having a spacing to one another which is somewhat smaller than the expansion of the moving element in its widest region. It is then particularly advantageous if the winding angles of the drive band around the fixed elements in each case amount to somewhat more than 90° and if the winding angle around the moving element has somewhat more than 180°.

If the drive is actuated in this case, then the forces exerted onto the drive band by the expanding gas result in the moving element being pulled in the direction of the two fixed elements by the drive band. If the moving element abuts the two fixed elements, then the drive band is clamped between the moving element and the two fixed elements. The drive band is prevented form slipping through in this way and the desired fixing of the drive band achieved.

In a particularly advantageous constructive embodiment, the elements are substantially formed by bolts whose end surfaces adjoin the plates. A mechanically simple fixing apparatus is provided in this way which ensures reliable operation.

It applies to both alternatives of the fixing apparatus that they can be made without large economic costs and can possibly even be easily retro-fitted into existing drives. A further advantage is that already existing drive bands can be used. The drive band is furthermore used in its one-piece form. A complex assembly of a shorter and a longer drive band section each with one end at the drive shaft and the correspondingly other end at the fixing apparatus is thus not necessary.

BRIEF DESCRIPTION OF THE DRAWINGS

The various features and advantages of the present invention will become more apparent as a detailed description of the preferred embodiments is given with reference to the appended figures wherein.

DETAILED DESCRIPTION OF THE PREFERRED EMBODIMENTS

Figure 1:
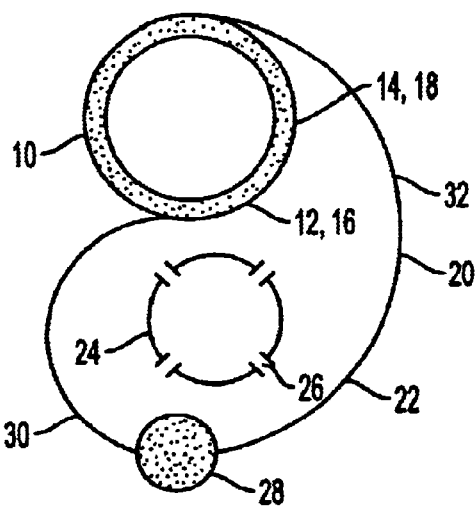
FIG. 1 is a schematic representation of a drive according to a first embodiment of the invention in an idle state.

FIG. 1 shows the idle or normal state of a drive of the invention for a belt tensioner which can be used, for example, in a safety belt apparatus of the type described in DE 199 61 109 A. The drive is located in a drive chamber (not shown) which is bounded, among other things, by two spaced plates (not shown) which are arranged mutually parallel with respect to each other.

A drive shaft 10 is shown having two fastening points 12, 14 at which the two drive band ends 16, 18 of a drive band 20 are fastened to the drive shaft 10. The drive band 20 forms a loop 22 which extends about a gas generator 24. The generator is formed with a plurality of gas outlet openings 26 through which gas can be discharged into the inside of the loop 22 in the event of drive actuation.

The gas generator 24 can be disposed at essentially any portion within the loop 22. In the embodiment shown in FIGS. 1 and 2, the gas generator 24 is located approximately on a straight line which extends from the drive shaft 10 to a fixing apparatus 28. With this arrangement the gas generator 24 is interposed between the drive shaft 10 and the fixing apparatus. The spacing between fixing apparatus 28 and the gas generator 24 is approximately the same as the spacing between the drive shaft 10 and the gas generator 24.

The fixing apparatus 28 serves to connect or fix a predetermined portion of the drive band 20 to the plates of the drive chamber and divides the wind off sections of the drive band 20 in the idle state, into a shorter section 30 and a longer section 32 with a length ratio of around 1:2.

Figure 2:
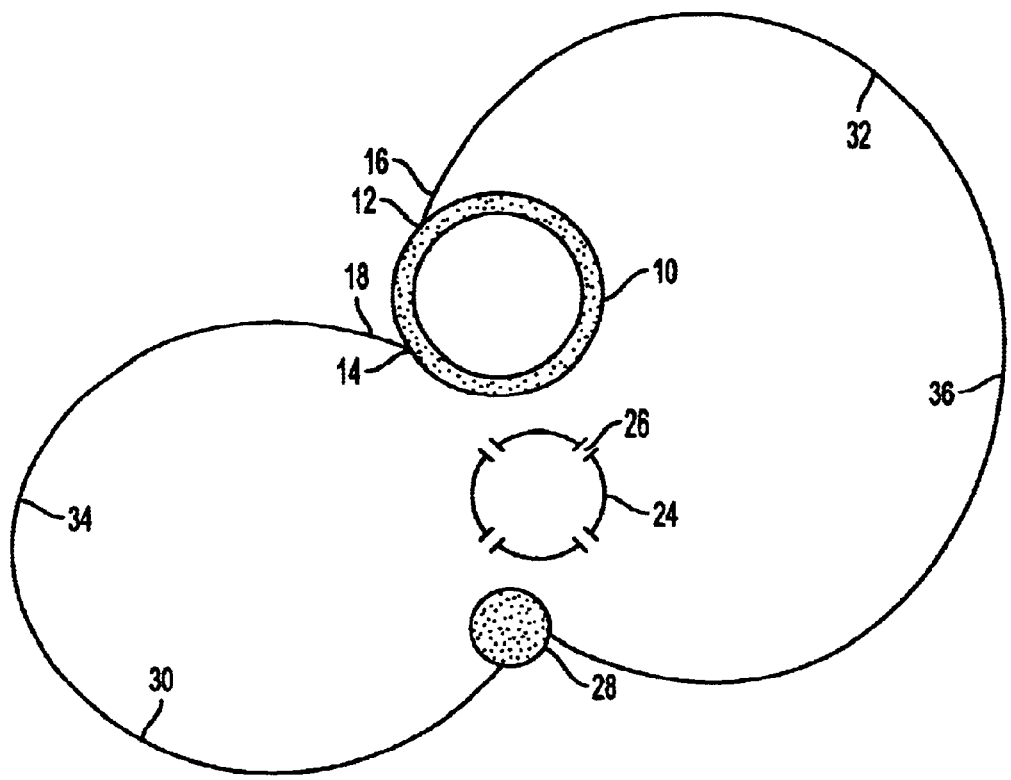
FIG. 2 is a schematic representation of the drive according to the first embodiment in an actuated state.

FIG. 2 shows the drive of the invention in actuated state. In response to the gas generator 24 being triggered, for example in the event of an accident, by an acceleration sensor (not shown) gas is discharged through the gas outlet openings 26 into the inside of the loop 22. The loop 22 formed by the drive band 20 expands and the drive shaft 10 rotates as the drive band 20 is wound off from the drive shaft 10.

As will be appreciated, the loop 22 expands in essentially all directions except that which is prevented by the fixing apparatus 28. This results in a non-circular deployment of the expanded loop 22, and induces the formation of two lobes. As shown, one is smaller than the other. In this figure, the smaller loop is denoted by 34 and the larger approximately circular loop is denoted by 36. The smaller loop 34 is formed by the shorter section 30 of the drive band while the larger part loop 36 is formed by the larger section 32 of the drive band.

Figure 3:
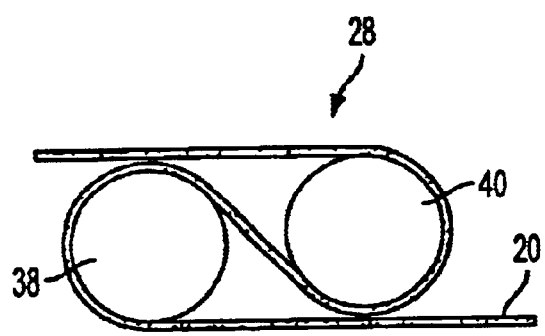
FIG. 3 is a schematic representation of a fixing apparatus used in the first embodiment of the present invention to secure a preselected portion of the drive band in an immovable position.

FIG. 3 shows the fixing apparatus 28 used in a first embodiment. The fixing apparatus 28 has two fixed elements 38, 40 which are formed by two bolts whose two ends are fixedly connected to the plates of the drive chamber. As shown, these fixing elements 38, 40 are spaced with respect to one another. The drive band 20 is wound around each of the two fixed elements 38, 40, with the winding angle at both fixed elements 38, 40 amounting in each case to somewhat more than 180°.

The diameter of the bolts 38, 40 and the spacing between the bolts 38, 40 are substantially based on the minimum possible radius of curvature of the drive band 20 and are selected such that the drive band 20 is not kinked, but has a continuous curvature. The spacing between the bolts 38, 40 is approximately in a range between 3 mm and 20 mm. The inner clearance resulting between the bolts 38, 40 has approximately one and a half to five times the thickness of the drive band 20.

Figure 4:
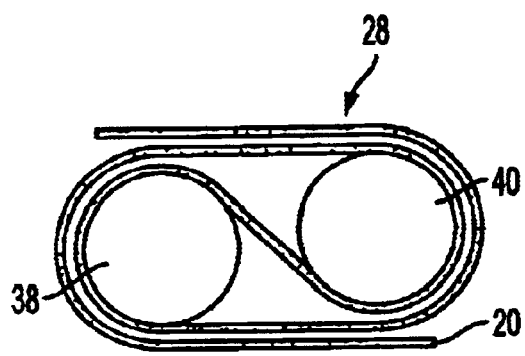
FIG. 4 is a schematic representation of a first alternative of the fixing apparatus which features two windings of the drive band about the securing members.

As shown in FIG. 4, the drive band 20 can, as a variant of the first embodiment, be wound around each of the fixed elements 38, 40 another time in order to increase the friction in the fixing apparatus 28 and thus in order to improve the fixing effect. In this case, the drive band 20 has two additional windings with a winding angle of substantially 180°.

Figure 5:
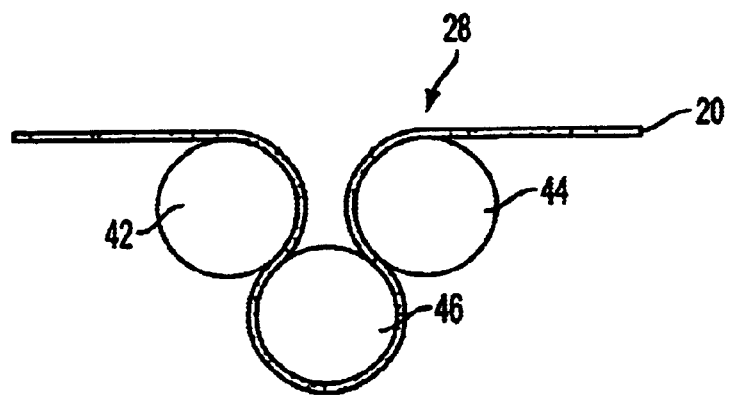
FIG. 5 is a schematic representation of a second alternative of the fixing apparatus.

A second embodiment of the fixing apparatus 28 of the invention is shown in FIG. 5. It has two fixed elements 42, 44, which are formed by two bolts fastened to the plates of the driving chamber by their respective ends, and a moving element 46. The moving element 46 is formed by a bolt which is in sliding engagement with the plates of the driving chamber.

The radii of the bolts 42–46 do not fall short of the minimum achievable radius of curvature of the drive band 20 in order to avoid a kinking of the drive band 20. At the same time, the diameter of the moving bolt 46 is selected such that a tilting of the bolt 46 in the event of a displacement thereof is excluded. The inner clearance between the two fixed elements 42, 44 is selected less than the maximum diameter of the moving element 46.

The drive band 20 is wound around the three elements 42–46 such that the winding angle around the fixed elements 42, 44 is in each case larger than 90° and the winding angle around the moving element 46 amounts to more than 180°. If the expanding gas exerts a force onto the drive band 20 in the event of an actuation of the gas generator, then this is expressed in the fixing apparatus 28 in a pull at the drive band 20 which results in the moving element 46 being drawn in the direction of the fixed elements 42, 44 and the drive band 20 being clamped between the moving element 46 and the fixed elements 42, 44. An effective fixing of the drive band 20 in the fixing apparatus 28 can thus be achieved in a simple manner.

The priority application, DE 101200019.6, is incorporated by reference herein in its entirety.

What is claimed is:

1. A drive for a safety belt tensioner, comprising:
   two mutually parallel side plates;
   a drive shaft disposed between the side plates;
   a drive band having first and second ends which are connected to the drive shaft such that the drive band forms a loop that is adapted to be at least partially wrapped around the drive shaft and that forms a drive chamber with the side plates, wherein the chamber is configured to receive gases for expanding the loop, unwrapping the loop from the drive shaft and inducing the drive shaft to rotate; and
   a fixing apparatus for fixing a predetermined portion of the band to the plates at a position between the first and second ends and limiting the expansion of the loop in at least one direction.

2. A drive as claimed in claim 1, wherein the fixing apparatus has two fixed elements which extend between the side plates and around which the drive band is wound.

3. A drive as claimed in claim 2, wherein a winding angle of the drive band around each of the two fixed elements is greater than 180°.

4. A drive as claimed in claim 2 wherein more than one winding of the drive band is provided around at least one of the two fixed elements.

5. A drive as claimed in claim 2, wherein the drive band is wound on the two fixed elements and includes
   a first winding with a winding angle of somewhat more than 180° around each of the two fixed elements, and
   a second winding with a winding angle of substantially 180° around each of the two fixed elements.

6. A drive as claimed in claim 2, wherein the fixed elements are spaced by a clearance which is approximately in the range of one and a half to five times more than a thickness of the drive band.

7. A drive as claimed in claim 1, wherein the fixing apparatus comprises two fixed elements which are fixed to the side plates and one movable element which is movable with respect to the two fixed elements.

8. A drive as claimed in claim 7, wherein the fixed elements are spaced from one another by a distance which is less than a minimum width dimension of the moving element.

9. A drive as claimed in claim 8, wherein the winding angle of the drive band around the fixed elements is greater than 90° and the winding angle around the moving element is greater than 180°.

10. A drive as claimed in claim 2, wherein the elements are substantially formed by bolts whose end surfaces adjoin the plates.

11. A drive as claimed in claim 1, wherein the fixing apparatus divides the wound off part of the drive band in the idle state into two sections with a length ratio of approximately 1:2.

* * * * *